July 26, 1960 S. E. TOWNSEND 2,946,987
REVERSIBLE MAGNETIC SHIFT REGISTER
Filed June 16, 1958
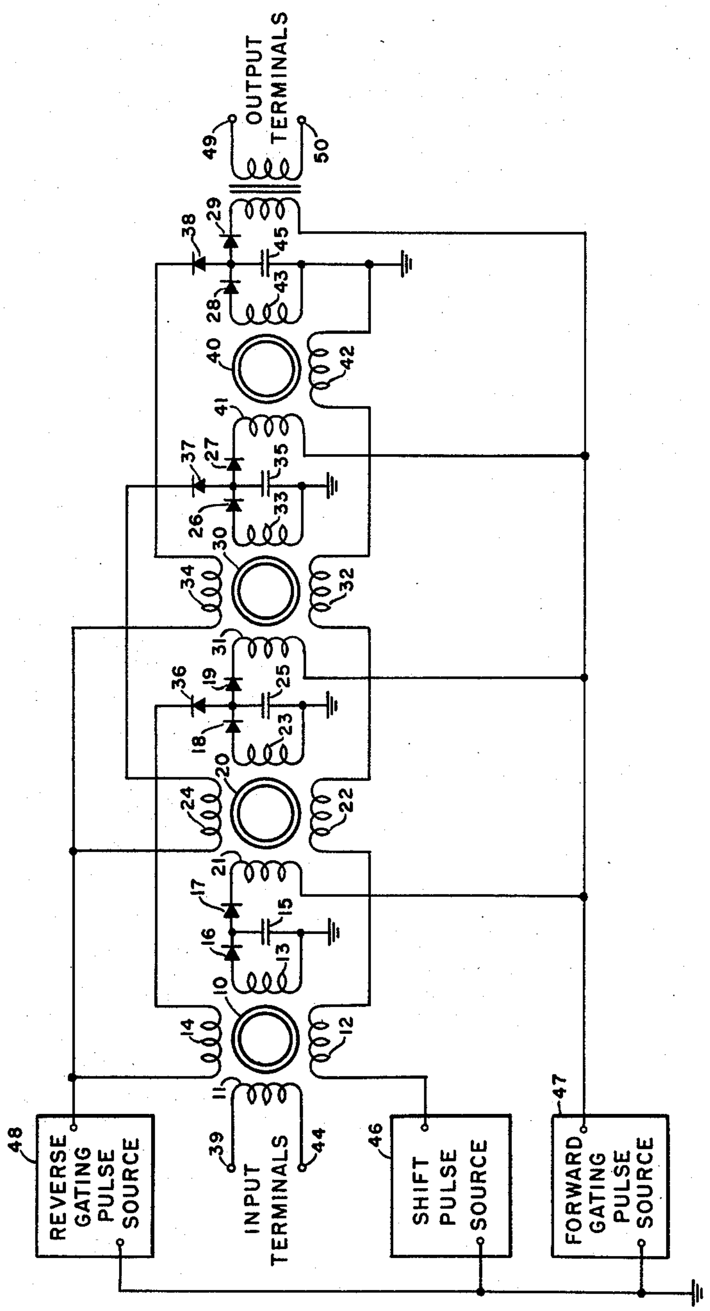
INVENTOR.
STEPHEN E. TOWNSEND
BY Richard G. Stahr
ATTORNEY United States Patent Office
2,946,987
Patented July 26, 1960

2,946,987

REVERSIBLE MAGNETIC SHIFT REGISTER

Stephen E. Townsend, Rochester, N.Y., assignor to General Dynamics Corporation, Rochester, N.Y., a corporation of Delaware Filed June 16, 1958, Ser. No. 742,120
3 Claims. (Cl. 340—174)

This invention relates to magnetic shift register circuits and, more specifically, to reversible shift register circuits employing a single magnetic member per bit and requiring two shift pulses.

Prior art magnetic shift register circuits have extensively used magnetic storage elements as switching devices by advantageously utilizing the substantially square hysteresis loop characteristics exhibited by the magnetic materials used in these elements.

Such elements are normally cascaded so that the output signal from one magnetic storage element may become the input signal to a succeeding magnetic storage element or to a preceding magnetic storage element. This is attained by connecting the output winding of each storage element to the input winding of the adjacent storage element through a suitable coupling network providing for the transmission of information in either direction. If each magnetic storage element is used as a binary storage element, then read-in and readout tends to occur simultaneously. To avoid such operation, prior art magnetic shift registers have required two elements per bit or the inclusion of a delay network between the elements. Both of these systems have proven objectionable in that the two element per bit system requires a multiplicity of expensive components and the delay networks of the single element systems place tight restrictions upon the width of the shift pulse which may be employed.

It is accordingly an object of this invention to provide an improved reversible magnetic shift register circuit.

It is another object of this invention to provide a reversible shift register circuit which provides the reliability of a two member per bit system with the economy of a one member per bit system.

In accordance with this invention, adjacent magnetic members of a reversible magnetic shift register circuit are intercoupled by unidirectional binary information transfer circuits. Included in one of these transfer circuits is a non-magnetic storage element which intercepts the binary information which has been read out from a magnetic member in response to a shift pulse applied to all of the magnetic members simultaneously and stores this binary information until the termination of the shift pulse, at which time it may be transferred to the next succeeding magnetic member or to the next preceding magnetic member through the action of a forward gating pulse or a reverse gating pulse, respectively.

For a better understanding of the present invention, together with further objects, advantages and features thereof, reference is made to the following description and accompanying drawing in which the single figure illustrates a preferred embodiment of this invention.

The single figure illustrates the reversible shift register of this invention as a series of magnetic members, indicated at 10, 20, 30 and 40, coupled in cascade between input terminals 39 and 44, through which binary information may be applied to this reversible shift register, and output terminals 49 and 50. Any suitable source of binary information signals may be connected to input terminals 39 and 44 and any suitable system which may utilize binary information signals may be connected to output terminals 49 and 50. As these systems are well known in the art and may be, for example, portions of a computer circuit, they are not included in the figure.

A shift pulse source, a forward gating pulse source and a reverse gating pulse source are indicated at reference numerals 46, 47 and 48, respectively. As the details of these sources form no part of this invention, they will not be described in detail in this specification except for an explanation of their specific functions and, hence, have been indicated in block form.

Each of the magnetic members 10, 20, 30 and 40 are of the type which possess relatively square hysteresis loop characteristics and may be of any form, although a toroidal shape is preferred. As magnetic members of this type are well known in the art, they will not be described in detail in this specification except to point out that each may be magnetically saturated in either one of two stable conditions of saturation through the application of energizing current pulses of one polarity sense or of an opposite polarity sense, usually through coupling windings of one or more turns.

In applications, such as this, involving a binary code, either one of the two stable conditions of saturation may correspond to the "1" binary information bits, while the opposite stable condition of saturation may correspond to the "0" binary information bits. In general, shift register circuits are said to transfer "1" binary information bits between adjacent members, the "0" binary information bits being indicated by the absence of a "1" binary information bit in any member. Therefore, by applying a signal energizing current of a selected one polarity sense to any of the members, the stable condition of magnetic saturation corresponding to the "1" binary information bit may be produced in that member.

Intercoupling adjacent ones of the magnetic members of the reversible shift register of this invention, that is, 10 and 20; 20 and 30; and 30 and 40; is a forward unidirectional information transfer circuit. The forward transfer circuit intercoupling members 10 and 20 consists of coupling winding 13, diodes 16 and 17, coupling winding 21, forward gating pulse source 47 and shunt capacitor 15. The forward transfer circuit intercoupling members 20 and 30 consists of coupling winding 23, diodes 18 and 19, coupling winding 31, forward gating pulse source 47 and shunt capacitor 25. The forward transfer circuit intercoupling members 30 and 40 consists of coupling winding 33, diodes 26 and 27, coupling winding 41, forward gating pulse source 47 and shunt capacitor 35. These forward unidirectional information transfer circuits apply signal energizing current pulses of a selected one polarity sense from a preceding member to the next succeeding member in a manner to be described in more detail later.

To render the shift register circuit of this invention reversible, a reverse unidirectional information transfer circuit intercoupling the output of any member to the next preceding member is also provided. The reverse unidirectional transfer circuit intercoupling the output of member 20 with member 10 consists of diode 36, winding 14 and reverse gating pulse source 48. The reverse transfer circuit intercoupling the output of member 30 with member 20 consists of diode 37, coupling winding 14 and revers gating pulse source 48. The rereverse transfer circuit intercoupling the output of member 40 with member 30 consists of diode 38, coupling winding 34 and reverse gating pulse source 48. These reverse unidirectional information transfer circuits apply signal energizing current pulses of a selected one polarity sense from any member to the next preceding member in a manner to be described in more detail later.

As the "1" binary information bits are thought of as being transferred from member to member, a selected one polarity sense signal energizing current may be applied to the first member of the reversible shift register of this invention through coupling winding 11 from input terminals 39 and 44, thereby producing in the first member the stable condition of magnetic saturation corresponding to a "1" binary information bit.

To transfer a "1" binary information bit between any adjacent members, a shift energizing current pulse of a polarity sense opposite that of the signal energizing current pulse may be applied to all of the members simultaneously, thereby reversing the condition of saturation of all members which are in the stable condition of saturation corresponding to "1" binary information bits and producing a signal energizing current pulse which may be transferred to either adjacent member. Assuming that member 10 has been magnetically saturated in the stable condition of saturation corresponding to a "1" binary information bit through the application of a signal energizing current of a selected polarity sense to coupling winding 11 through input terminals 39 and 44, it may be said that member 10 contains a "1" binary information bit which is to be transferred to member 20. To effect this transfer, a shift energizing current pulse from shift pulse source 46 is applied to all of the members simultaneously in a polarity sense opposite that selected for the signal energizing current pulse through coupling windings 12, 22, 32 and 42, respectively. As this shift energizing pulse is applied in a polarity sense opposite that of the signal energizing current pulse, the stable condition of saturation of member 10 will be reversed thereby, producing a potential in winding 13 through transformer action well known in the art. This potential produces a signal energizing current to be applied, through the unidirectional information transfer circuit as previously described, to the next succeeding member 20 in a selected polarity sense to produce in member 20 the stable condition of saturation corresponding to a "1" binary information bit.

As simultaneous read-in and readout is to be avoided, shunt capacitor 15 is included in the forward unidirectional information transfer circuit to intercept the signal energizing current pulse produced by the potential induced in winding 13 and store this pulse until the termination of the shift current energizing pulse. Capacitor 15 is, therefore, charged by current flowing through diode 16.

To insure the charging of capacitor 15 and to prevent the flow of signal energizing current through winding 21 of member 20 until the termination of the shift energizing current pulse, a forward gating pulse of proper polarity to provide a back bias on diode 17 is produced in forward gating pulse source 47. At the termination of the shift energizing current pulse, this gating pulse is removed from diode 17, thereby releasing the back bias, and permitting the charge contained in capacitor 15 to discharge through winding 21 in a selected polarity sense to produce the stable condition of magnetic saturation in member 20 corresponding to a "1" binary information bit. Diode 16, of course, prevents the discharge of capacitor 15 back through winding 13 of member 10.

As the shift energizing current pulses continue, this same sequence of events takes place to transfer the "1" binary information bit from member 20 to member 30 and from member 30 to member 40 in a manner as has just been described.

To illustrate the reversible feature of the magnetic shift register of this invention, assume that the "1" binary information bit which is now contained in member 20 is to be transferred back to member 10. As has been explained before, a shift energizing current pulse from shift pulse source 46 is applied to all of the members of the shift register circuit simultaneously in a polarity sense opposite that selected for the signal energizing current pulse through coupling winds 12, 22, 32 and 42, respectively. As this shift energizing current pulse is applied in a polarity sense opposite that of the signal energizing current pulse, the stable condition of saturation of member 20 will be reversed thereby producing a potential in winding 23 through transformer action well known in the art. This potential produces a signal energizing current which flows through diode 18 and charges capacitor 25.

To insure the charging of capacitor 25 and to prevent the flow of the signal energizing current through winding 31 of member 30 and through winding 14 of member 10 until the termination of the shift energizing current pulse, a forward gating pulse of proper polarity to provide a back bias on diode 19 is produced by forward gating pulse source 47 and a reverse gating pulse of proper polarity to provide a back bias on diode 36 is produced by reverse gating pulse source 48. At the termination of the shift energizing current pulse, the reverse gating pulse is removed from diode 36, thereby releasing the back bias, and permitting the charge contained in capacitor 25 to discharge through winding 14 of member 10 in a selected polarity sense to produce the stable condition of magnetic saturation in member 10 corresponding to the "1" binary information bits. Diode 18, of course, prevents the discharge of capacitor 25 back through winding 23 of member 20.

As the application of the shift energizing current pulses to any of the members already in the stable condition of magnetic saturation corresponding to the "0" binary information bits, no signal energizing current pulse will be produced in that member, hence no charge will be placed in the respective shunt capacitors.

In a practical application, of course, the information supplied to input terminals 39 and 44 is in a timed relationship with the advance energizing current pulses and the forward and reverse gating pulses. Such timing techniques are well known in both the magnetic shift register and computer arts and, therefore, need not be described in detail. While this specification and drawing have illustrated and described only four cascaded stages, it is to be understood that additional stages may be added through unidirectional information transfer circuits as herein indicated, or the final stage may be intercoupled with the initial stage through similar unidirectional information transfer circuits.

While a preferred embodiment of this invention has been shown and described, it will be obvious to those skilled in the art that various modifications and substitutions may be made without departing from the spirit of this invention which is to be limited only within the scope of the appended claims.

What is claimed is:

1. A reversible shift register comprising a plurality of magnetic members each capable of being magnetically saturated in either one of two stable conditions of saturation in response to applied energizing current pulses of a first polarity sense or of another polarity sense, forward and reverse unidirectional information transfer circuit means intecoupling adjacent ones of said members for applying signal energizing current pulses of a selected one polarity from any member to either adjacent member, means for applying a shift energizing current pulse to all of said members simultaneously in a polarity sense opposite that of said signal energizing current pulses, a nonmagnetic storage element included in said information transfer circuit means for intercepting and storing said signal energizing current pulses, said transfer circuit means having forward and reverse gating means to be activated for preventing the application of said signal energizing current pulse from said storage element to either adjacent member until after the termination of said shift energizing current pulse, and means for deactivating a selected one only of said forward and reverse gating means after termination of said shift energizing current pulse to thereby transfer the signal energizing current pulse stored in the respective storage element to a selected one of said adjacent members to thus provide forward or reverse shift registration.

2. A reversible shift register comprising a plurality of magnetic members each capable of being magnetically saturated in either one of two stable conditions of saturation in response to applied energizing current pulses of a first polarity sense or of another polarity sense, forward and reverse unidirectional information transfer circuit means intercoupling adjacent ones of said members for applying signal energizing current pulses of a selected one polarity from any member to either adjacent member, coupling winding means for applying a shift energizing current pulse to all of said members simultaneously in a polarity sense opposite that of said signal energizing current pulses, a non-magnetic storage element included in said information transfer circuit means for intercepting and storing said signal energizing current pulses, said transfer circuit means having forward and reverse gating means to be activated for preventing the application of said signal energizing current pulse from said storage element to either adjacent member until after the termination of said shift energizing current pulse, and means for deactivating a selected one only of said forward and reverse gating means after termination of said shift energizing current pulse to thereby transfer the signal energizing current pulse stored in the respective storage element to a selected one of said adjacent members to thus provide forward or reverse shift registration.

3. A reversible shift register comprising a plurality of magnetic members each capable of being magnetically saturated in either one of two stable conditions of saturation in response to applied energizing current pulses of a first polarity sense or of another polarity sense, forward and reverse unidirectional information transfer circuit means intecoupling adjacent ones of said members for applying signal energizing current pulses of a selected one polarity from any member to either adjacent member, coupling winding means for applying a shift energizing current pulse to all of said members simultaneously in a polarity sense opposite that of said signal energizing current pulses, a single shunt capacitor included in said information transfer circuit means for intercepting and storing said signal energizing current pulses, said transfer circuit having forward and reverse gating means to be activated for preventing the application of said signal energizing current pulse from said storage element to either adjacent member until after the termination of said shift energizing current pulse, and means for deactivating a selected one only of said forward and reverse gating means at the termination of said shift energizing current pulse to thereby transfer the signal energizing current pulse stored in the respective capacitor to a selected one of said adjacent members to thus provide forward or reverse shift registration.

References Cited in the file of this patent

UNITED STATES PATENTS 2,831,150 Wright ---------------- Apr. 15, 1958
2,863,138 Hemphill --------------- Dec. 2, 1958

Notice of Adverse Decision in Interference

In Interference No. 91,927 involving Patent No. 2,946,987, S. E. Townsend, Reversible magnetic shift register, final judgment adverse to the patentee was rendered July 12, 1962, as to claims 1 and 2.

[*Official Gazette August 7, 1962.*]